Jan. 27, 1959     E. M. SAVAGE     2,871,333
WIRE SOLDER FEEDING MECHANISM
Filed July 1, 1957
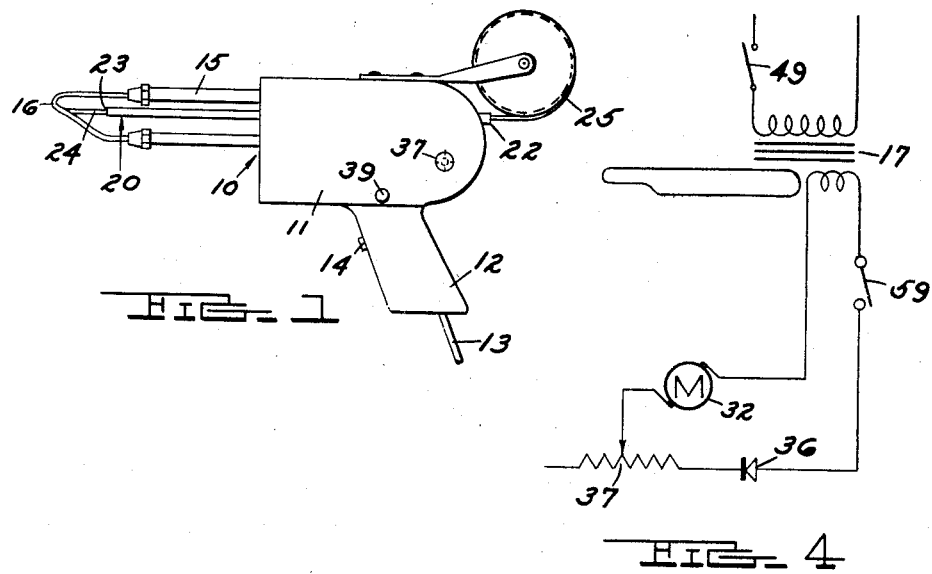
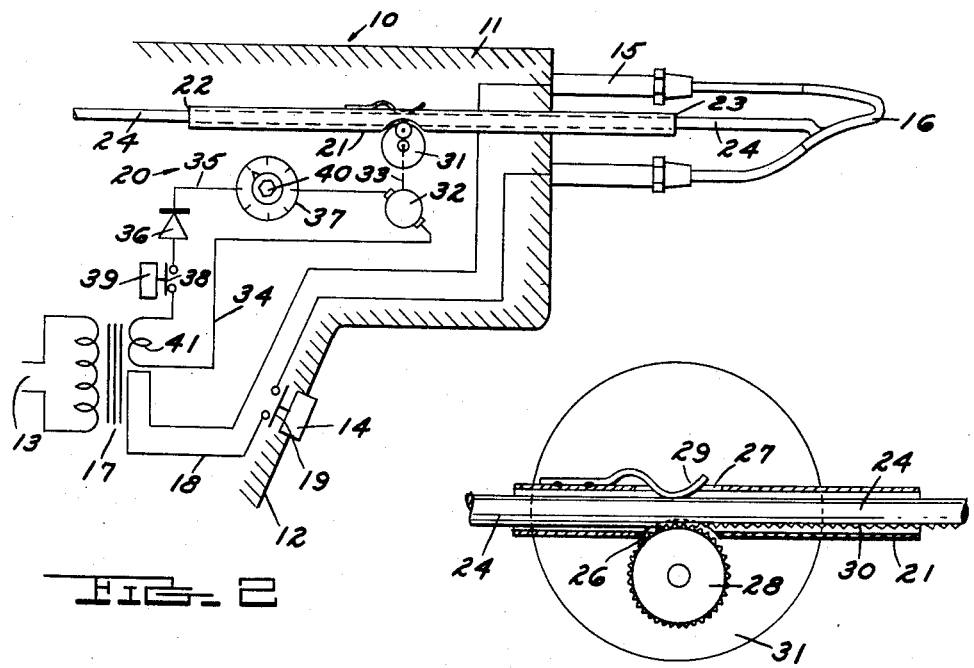
INVENTOR.
EUGENE M SAVAGE
BY
ATTORNEY United States Patent Office 2,871,333
Patented Jan. 27, 1959

2,871,333
WIRE SOLDER FEEDING MECHANISM
Eugene M. Savage, Pontiac, Mich.
Application July 1, 1957, Serial No. 669,148
4 Claims. (Cl. 219—27)

This invention relates to a wire solder feeding mechanism for use on soldering guns for continuously or semi-continuously feeding solder to the melting tip contacting the workpieces.

Soldering guns have been employed heretofore to facilitate the application of solder to workpieces, however, the several devices of the prior art while satisfactory in themselves have the inherent disadvantage of requiring the operator to have three hands; one for holding the workpiece, one for holding the soldering gun, and one for holding the solder. This requires the workman with the prior art devices to clamp or position the workpieces so that he can operate the solder in one hand and the gun in the other thereby requiring special application of jigs and fixtures in high production soldering such as in TV chassis, radios, etc.

With the foregoing in view, the primary object of the invention is to provide a soldering gun and solder feeding mechanism which is simple in design and construction, inexpensive to manufacture, easy to use, and which requires only two hands of the operator: one for holding the combined soldering gun and feeding mechanism and the other for holding the workpieces thereby completely eliminating the necessity for holding the solder and the incident jigs and fixtures.

An object of the invention is to provide a wire solder feeding mechanism for a soldering gun which can be manufactured inexpensively as the component parts are easily made and the assembly of the parts readily accomplished.

An object of the invention is to provide a wire solder feeding mechanism for a soldering gun which can be operated with ease by a professional or amateur user.

An object of the invention is to provide wire solder feeding mechanism which can be fitted to all sizes of guns and which can receive various sizes of solder without changes in its assembly or arrangement of parts.

An object of the invention is to provide a solder feeding arrangement having an adjustable rate of feed easily adjusted by the user, such as in high production use, so that the solder will automatically be fed as fast as it is consumed in the work.

An object of the invention is to provide thumb button or trigger action control for the solder feeding mechanisms so that the operator can start or stop the feeding mechanism as desired.

These and other objects of the invention will become apparent by reference to the following description of a wire solder feeding mechanism for a soldering gun embodying the invention taken in connection with the accompanying drawing in which:

Fig. 1 is a side elevational view of a soldering gun equipped with the inventive wire solder feed showing solder from the spool entering the channel member at the back of the gun and emitting from the channel member adjacent the soldering tip.

Fig. 2 is a diagrammatic showing of the internal construction of the gun, the wire solder feeding mechanism, and electrical circuit.

Fig. 3 is an enlarged partial showing of the solder driving mechanism as seen in Fig. 2; and Fig. 4 is a modified wiring diagram for the feeding mechanism and gun heat control.

Referring now to the drawing wherein like numerals refer to like and corresponding parts throughout the several views, the soldering gun and wire solder feeding mechanism and circuits disclosed therein to illustrate the invention comprise an electric soldering gun, heating element, and electric circuit combined with a wire solder feeding mechanism which includes means for channeling the solder to the gun melting tip and solder engaging driving means on the member for driving the solder and power means, circuit, and switch for controlling the feed.

More particularly, the inventive device comprises a soldering gun 10 having a body 11, handle 12, electrical cord 13, switch trigger 14, heating element 15 and soldering tip 16. A transformer 17 is enclosed within the body 11 and includes a circuit 18 interrupted by the switch 19 which is operated by the trigger 14 to control the heat to the tip 16.

The wire solder feeding mechanism 20 comprises a channel member 21 having an entrance end 22 for receiving and an exit end 23 for emitting the wire solder 24 which is stored on the reel 25 and it is to be noted that the channel member 21 is angled or directed so as to project the wire solder 24 into contact with the hot tip 16. The channel member 21 has an intermediate side wall opening 26 and an oppositely disposed side wall opening 27; the toothed wheel 28 projects into the channel portion of the member 21 via the opening 26 and the spring clip 29 projects into the channel portion of the member 21 via the opening 27 respectively so that wire solder 24 of various sizes fed through the channel member 21 is effectively engaged by the teeth of the wheel 28 so as to coin rack teeth 30 in the wire solder 24 and it is to be noted that the spring clip 29 forces the solder into coining relationship with the wheel 28 regardless of whether or not the wire solder 24 varies in diameter.

In other words, any of the three standard diameter wire solders can be used with the inventive device due to the fact that the channel member 21 is capable of receiving the largest size and to force same into engagement with the toothed wheel 28 and the spring clip 29 is capable of forcing the intermediate and smallest size wire solder into forced engagement with the wheel 28 so as to enable the wheel 28 to drive the wire solder 24 by coining rack teeth therein.

The toothed wheel 28 is driven by the wear train 31 which is powered by the 1½–3 volt D. C. motor 32 via the shaft 33; the motor is powered by the circuit 34 on one side thereof and the circuit 35 on the other side thereof which includes the 500 mille-amps. silicon rectifier 36, the 0 to 50 ohm potentiometer 37, and the switch 38 which is operated by the trigger or button 39. The potentiometer 37 is exposed through the case 10 for outside adjustment via the Allen wrench socket 40 so that the speed of the motor 32 can be regulated by the operator conveniently; the motor circuit receives its power from the transformer 17 via windings 41 or other suitable hook-up as is well understood in the electrical art.

It is to be noted in the wiring circuit of Fig. 2 that power is fed to the transformer 17 by the cord 13 and the heating circuit 18 is separately controlled by the switch 19 and the feeding circuit 34 and 35 is controlled by the switch 38. In Fig. 4 the switch 49 is disposed in the power leads to the transformer 17 so that the switch 59 in the feed circuit is subject to the closing of the switch 49 in the supply circuit and in this regard it is to be particularly noted that the switch 59 can be eliminated in high production use and the speed of the motor 32 controlled by the adjustment of the potentiometer 37 thereby obviating the necessity for two switches.

In operation in the embodiment containing two switches, the operator presses the heat trigger 14 closing the switch 19 causing the soldering tip 16 to heat so as to melt the end of the solder 24 in contact therewith so as to cause a flow of melted solder whereupon the operator presses the feed button 39 with his thumb closing the feed circuit which converts the A. C. current coming from the transformer 17 via the rectifier 36 to D. C. which is then fed through the potentiometer 37 to the motor 32 causing the drive 33 to operate the gear train 31 which is preferably a 1000 to 1 gear reduction so as to power the toothed wheel 28 which coins the rack teeth or serrations 30 in the wire solder 24 and causes it to travel in the channel member 21 towards the heated tip 16 where it contacts the tip 16 and melts and the reel or spool 25 furnishes a supply of wire solder continuously as desired. Obviously the spool 25 can be eliminated and pieces of wire solder inserted if desired.

In the embodiment of Fig. 4, the operation is the same except that the switch 49 is in the power leads ahead of the transformer 17 so as to contact power to the switch 59 so that the tip 16 is assured of heat prior to feeding. However, the switch 59 can be deleted and the feed rate adjusted by the potentiometer 37 so that feed at the set rate occurs when the switch 49 is closed.

The inventive soldering gun and feeding mechanism with the features described constitutes a compact, durable, and neat appearing mechanism easily operated to feed solder at any desired rate for rapid use for soldering parts without the necessity of jigs and fixtures.

Obviously the channel member 21 can be designed for one size solder wire and the spring clip 29 and opening 27 deleted; A. C. can be used to power the motor 32; circuits can be provided for the motor 32 leading directly from the cord 13 or other power source; and other changes made as desired such as placing the feed mechanism outside the gun in an entirely separate attached construction.

Although but preferred embodiments of the invention have been shown and described in detail, it is obvious that many changes may be made in the size, shape, detail, and arrangement of the various elements of the invention within the scope of the appended claims.

I claim:

1. In combination, an automatic solder-feeding mechanism and a soldering gun comprising a housing, a transformer in said housing, a solder melting resistance heating element circuit activated by said transformer having a solder and work contacting tip portion extending from said case, a solder channel member disposed through said housing having solder entrance and exit ends with said exit end being adapted to direct solder into contact with said tip and having an intermediate side wall opening for the partial penetration of a solder engaging toothed wheel, a toothed wheel projecting into the wire-solder containing channel of said member through said member side wall opening for forcibly engaging wire-solder contained therein to coin teeth in wire solder so as to travel wire solder in said member towards said tip via rotation of said wheel, and means for driving said wheel to advance solder toward said tip, said means comprising a gear train driving said wheel, a motor driving said gear train, a motor circuit powering said motor including a power take-off coil surrounding said transformer, a potentiometer in said motor circuit, a circuit powering said transformer, and a switch in said transformer circuit; both said circuits being energized by said switch; said motor speed being adjustable via said potentiometer to adjust the feed of solder to the heat of said resistance element.

2. In combination, an automatic solder-feeding mechanism and a soldering gun comprising a housing, a transformer in said housing, a solder melting resistance heating element circuit activated by said transformer having a solder and work contacting tip portion extending from said housing, a switch in said heating circuit, a wire solder channel member disposed through said housing having wire-solder entrance and exit ends with said exit end being adapted to direct wire solder into contact with said tip and having an intermediate side wall opening for the partial penetration of a wire-solder engaging toothed wheel, a toothed wheel projecting into the wire-solder containing channel of said member through said member side wall opening for forcibly engaging wire-solder contained therein to coin teeth in wire-solder in conjunction with rotation of said wheel so as to travel wire solder in said member towards said tip via rotation of said wheel, a gear train driving said wheel, a motor driving said gear train, a circuit for powering said motor energized by said transformer, a rectifier in said motor circuit, a potentiometer in said motor circuit for adjusting the speed of said motor, and a switch in said motor circuit.

3. In combination, an automatic solder-feeding mechanism and a soldering gun comprising a housing, a transformer in said housing, a solder melting resistance heating element circuit activated by said transformer having a solder and work contacting tip portion extending from said housing, a switch in said heating circuit, a wire-solder channel member disposed through said housing having wire-solder entrance and exit ends with said exit end being angled to direct wire-solder into contact with said tip and having an intermediate side wall opening for the partial penetration of a wire-solder engaging toothed wheel, a toothed wheel projecting into the wire-solder containing channel of said member through said member side wall opening for forcibly engaging wire-solder contained therein to coin teeth in wire-solder in conjunction with rotation of said wheel so as to travel wire solder in said member towards said tip via rotation of said wheel, a gear train driving said wheel, a D. C. motor driving said gear train, a circuit for powering said motor energized by said transformer, a rectifier in said motor circuit, a potentiometer in said motor circuit for adjusting the speed of said motor, a switch in said motor circuit; said member having a spring pressed pad receiving opening adjacent said toothed wheel and oppositely disposed thereto; and a spring pressed pad depending into the channel of said member adapted to press wire-solder of various diameters into engagement with said wheel.

4. An automatic solder-feeding mechanism for a soldering gun comprising a solder channel member disposed adjacent a gun having wire-solder entrance and exit ends with said exit end being angled to direct wire-solder into contact with a gun tip and having an intermediate side wall opening for the partial penetration of a wire-solder engaging toothed wheel, a toothed wheel projecting into the wire-solder containing channel of said member through said member side wall opening for forcibly engaging wire-solder contained therein to coin teeth in wire solder so as to travel wire-solder in said member towards said tip via rotation of said wheel, a reduction gear train driving said wheel, a motor driving said gear train, and circuit powering said motor, and a switch in said motor circuit for connecting and interrupting power to said motor for controlling solder feed as desired.

References Cited in the file of this patent

UNITED STATES PATENTS

| 538,695 | Osborne et al. | May 7, 1895 |
| 1,906,225 | Dupau | May 2, 1933 |
| 2,119,462 | Kull et al. | May 31, 1938 |
| 2,797,293 | Weber | June 25, 1957 |
| 2,810,168 | Nyborg | Oct. 22, 1957 |

FOREIGN PATENTS

| 507,997 | Great Britain | June 22, 1939 |
| 1,055,117 | France | Oct. 14, 1953 |